Oct. 26, 1948.   W. B. REED   2,452,069
GRID STRUCTURE
Filed Dec. 29, 1945

INVENTOR
WILLIAM BRADFORD REED
BY Elmer J. Gorn
ATTY.

Patented Oct. 26, 1948

2,452,069

UNITED STATES PATENT OFFICE 2,452,069

GRID STRUCTURE

William Bradford Reed, Westwood, Mass., assignor to Raytheon Manufacturing Company, Newton, Mass., a corporation of Delaware Application December 29, 1945, Serial No. 637,888

5 Claims. (Cl. 250—27.5)

This invention relates to the structure of thermionic tubes, and more particularly to a novel grid element and structure for use in such tubes.

The device of the invention finds its most useful application in the field of very small thermionic tubes, for example, those of the sub-miniature type, although it is not to be construed in any way as limited thereto.

An object of the invention is to devise a grid structure which provides a more effective control over the flow of electrons in the tube than that obtainable in prior art structures.

Another object is to devise a grid structure in which extremely close spacing of the grid wires may be obtained.

Another object is to provide a grid structure which is inherently strong and which will maintain its initial shape without the necessity of any internal supporting means.

A further object is to devise a grid structure in which the conventional grid side-supports are completely eliminated, and in which the grid is supported in position in the tube by novel means.

Another object is to devise a grid of very small size which is relatively simple and yet at the same time highly effective.

Other and further objects and advantages of the present invention will become apparent, and the foregoing will be understood in relation to the following exemplifications thereof, reference being had to the accompanying drawing in which.

Figure 1:
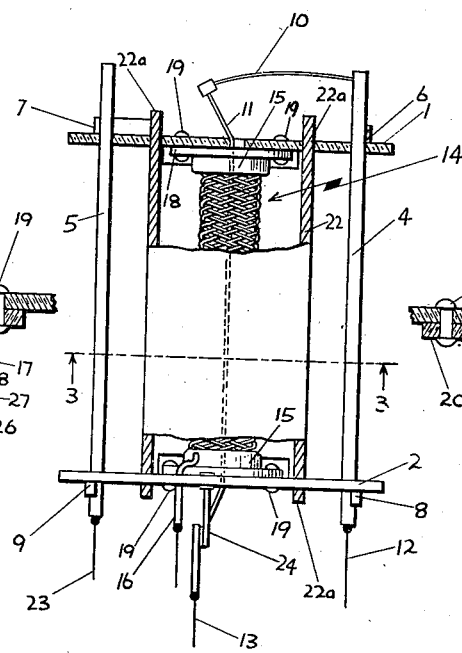
Fig. 1 represents, partly in cross-section and partly in perspective, a front view of the complete tube element assembly.

Mica spacers 1 and 2, spaced from each other, serve to support the tube element assembly as a whole between them and at the same time to insulate the elements from each other. These spacers are of the conventional type and have protuberances 3 at their outer edges which engage the inner walls of the tube envelope in the usual way. In order to maintain the spacers in fixed spatial relation, rigid support rods 4 and 5 extend between spacers 1 and 2, passing through holes in the spacers. Clips 6 and 7 are firmly attached to rods 4 and 5, respectively, for example by welding, and bear on the upper surface of spacer 1, as shown. Clips 8 and 9 are firmly attached to rods 4 and 5, respectively, in a similar manner, and bear on the lower surface of spacer 2, as shown. Spacers 1 and 2 are thereby positively prevented from moving further away from each other. Firmly supported by the upper end of rod 4, as by means of conducting spring member 10, which is attached to rod 4 at one end and to the filament at its other end, is an electron-emitting element 11, here shown as a filamentary-type cathode. Element 11 passes through spacer 1, extends between spacers 1 and 2, and at its lower end passes through spacer 2, being firmly attached thereto by means of bracket 24. Lead 12 is attached to the lower end of rod 4 and lead 13 is attached to bracket 24.

Figure 2:
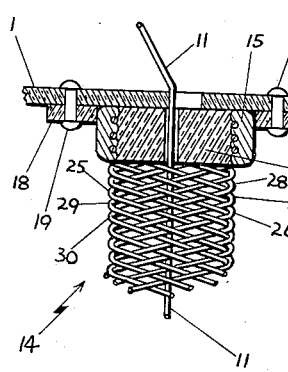
Fig. 2 is an enlarged fragmentary view of Fig. 1 showing the means for supporting the grid.

The control grid of the tube is indicated as a whole at 14. This grid element is made by first winding one group of individual wires helically in one direction about the periphery of a cylinder, using as a cylindrical form a section of relatively rigid wire, such as copper wire. The longitudinal axes of the individual wires are made parallel to each other and are spaced extremely close to each other, since in the device of this invention grid wires of extremely small diameter are used. A second group of individual wires is then wound helically in the opposite direction about the periphery of the same cylinder, utilizing a similar parallel relation and close spacing of the longitudinal axes of the individual wires. Actually, of course, since the above process is carried out on a braiding machine, the two groups of wires are wound at substantially the same time. As will be evident, due to the fact that the two groups of wires are wound helically in opposite directions about the periphery of the same cylinder, the wires of each group will cross over those of the other group at a plurality of points along the length of the cylinder, and if appropriate pitch and spacing of the wires are used, the longitudinal axes of the wires of one group will lie at an acute angle to those of the other group at the crossover points. In order to produce a mechanically rigid structure, one which will be self-supporting and which will maintain its original shape when the winding form is removed, the wires are interwoven or interlaced with each other. Wire 25 of one group, for example, as shown in Fig. 2, in its helical progression around the cylinder, passes successively under and over the wires of the other group; that is, it passes under wire 26, over wire 27, under wire 28, etc. The next adjacent wire to wire 25, in the same group, which is wire 29, passes successively over and under the same wires of the other group; that is, it passes over wire 26, under wire 27, over wire 28, etc.

Wire 30, next adjacent to wire 29 in its group, duplicates the crossover-point positions of wire 25, and so on. The braiding or interweaving of the grid wires in this manner, due to the successive over-under-over crossings of each and every wire of one group with each and every wire of the other group, results in a mechanically rigid grid structure, one which will maintain its original shape when it is mounted in the tube, without the use of any side supporting wires such as are required in the conventional grid or without its being necessary to fasten the individual wires to each other at points where they cross over each other. The interwoven grid structure may be mounted in the tube assembly by means engaging the structure only at its ends, as set forth in more detail hereinafter. By the interwoven grid structure of this invention, extremely close spacing of the wires, and therefore more effective control of the electron stream, may be had. Also, since no side support wires are needed, the hollow cylindrical grid can control the electron flow in the entire circular area around the filament.

It should be mentioned here that the Fig. 1 structure is shown greatly enlarged in the drawing, in order to make the details thereof easily discernible. Actually, of course, the tube element assembly is very much smaller in size than the showing of Fig. 1 might indicate, as this invention has particular utility in extremely small tubes. The interwoven grid structure may be rapidly and conveniently produced, even though it is of such small dimensions, on an automatic braiding machine, and therefore may be made very inexpensively.

In order to bind the loose ends of the interwoven grid wires in place, and in order to form a mass for support of the grid and for convenient electrical connection thereto, the operating part of the grid is masked off and molten metal is sprayed on the ends to form a metal band at each end which is solid and effectively integral with the grid itself. This effectively binds the wires to each other and prevents the whole from coming apart. The sprayed metal may be the same as that of the grid wires or it may be any other suitable type of metal, for example, nickel or copper. If it is either of the latter two metals, the spraying process may be used to make a cheap metal available as the band and some other desirable metal, for example tungsten, available as the active portion of the grid. If desired, the band-and-grid assembly can be fired after spraying to produce a better bond between the bands and the wires of the grid. Also, as an alternative procedure, prepared metallic bands can be welded to the braided structure instead of the spraying process being used.

In the drawing, 14 indicates the interwoven grid structure, and 15 indicates the metallic bands at both ends of the grid, said bands being applied either by spraying of the molten metal or by welding, as above described. Electrical connection to the grid may be easily made by spot welding lead 16 to the band 15 at the lower end of the grid, this lead passing through spacer 2 as shown.

Figure 4:
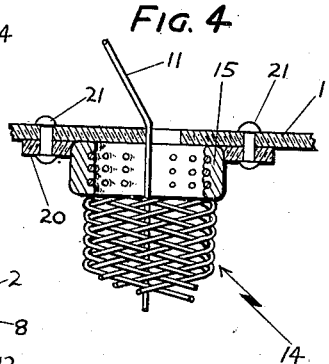
Fig. 4 is an enlarged fragmentary view showing an alternative grid supporting means.
Figure 3:
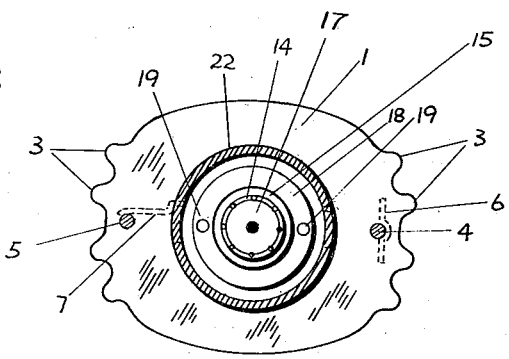
Fig. 3 is a cross-section taken on line 3—3 of Fig. 1 looking in the direction of the arrows.

In order to mount or support the grid rigidly between spacers 1 and 2, the mounting arrangement of Figs. 1-2 or that of Fig. 4 may be used. In Figs. 1-2, ceramic disk 17, which has a hole in its center through which element 11 passes, fits inside grid 14 and firmly engages the interior surface of band 15 and also contacts the lower surface of spacer 1. Ceramic collar 18 fits around and tightly engages the outer surface of band 15 and is fastened to spacer 1 by any suitable fastening means 19. Bands 15, at each end of grid 14, are in firm contact with the respective surfaces of spacers 1 and 2, and the lower end of grid 14 is mounted on spacer 2 in exactly the same manner as that described for the upper end of said grid and spacer 1.

In Fig. 4, interwoven grid 14 is supported between spacers 1 and 2 by means of a pair of mica collars 20 which intimately engage the outer surface of the band 15, one at each end of the grid, and which are stapled at 21 to the corresponding mica spacers 1 and 2.

Anode or plate 22 surrounds grid 14, being on the opposite side of grid 14 from filament 11, so that the grid is between the filament and the plate. Anode 22 is shown as being of cylindrical configuration, and is mounted between spacers 1 and 2 by means of integral tabs 22a which extend through the spacers and are fixed therein. Clip 7, which is welded to rod 5 at one end, is spot welded at its other end to one of the tabs 22a, so that lead 23 may be electrically connected to the lower end of rod 5 to serve, by means of rod 5 and clip 7, as the plate lead of the tube.

The tube element assembly shown in Fig. 1 is in turn sealed in an envelope, not shown, in the conventional manner.

It is to be understood that this invention is not limited to the particular details as described above as many equivalents will suggest themselves to those skilled in the art. For example, although a tube with a single grid has been shown, it will be obvious that the invention is equally applicable to a multigrid tube, and in this event the mica collars or ceramic collars which mount or support the grid may also be utilized as spacing means between the separate grids. Although a tube with a single cylindrical anode has been illustrated, it is apparent that tubes with more than one anode, with a split anode, or with other anode shapes than that shown, may be used in the practice of the invention. It is accordingly desired that the appended claims be given a broad interpretation commensurate with the scope of this invention within the art.

What is claimed is:

1. A grid element for a thermionic tube comprising a first group of individual wires progressing helically in one direction about the periphery of a cylinder, a second group of individual wires progressing helically in the opposite direction about said periphery, the two groups of wires being in interwoven relationship with each other at the points where they cross each other, and a solid metallic band rigidly fastened to each end of said element to prevent unraveling of the wires thereof.

2. A grid element for a thermionic tube comprising a first group of individual wires wound helically in one direction about the periphery of a cylinder, and a second group of individual wires wound helically in the opposite direction about said periphery, the longitudinal axes of the wires in the first group being parallel to each other and relatively close to each other, the longitudinal axes of the wires in the second group being parallel to each other, relatively close to each other, and at an acute angle to those of the first group, the wires of each group crossing those of the other group at acute angles at a plurality of points, each wire of either group passing over and under the successive wires of the other group at said points in its helical progression around the cylinder.

3. A grid element for a thermionic tube comprising a first group of individual wires wound helically in one direction about the periphery of a cylinder, and a second group of individual wires wound helically in the opposite direction about said periphery, the longitudinal axes of the wires in the second group being at an acute angle to those of the first group, the wires of each group crossing those of the other group at acute angles at a plurality of points, any wire of either group passing over and under the successive wires of the other group at said points in its helical progression around the cylinder, while the next adjacent wire to said last-mentioned wire passes under and over the same successive wires of the other group at corresponding points in its helical progression around the cylinder.

4. A thermionic tube structure comprising support means, an electron-emitting element, a grid surrounding said element, and at least one additional element surrounding said grid, said grid being made of a plurality of wires crossing each other at acute angles at a plurality of points and being interwoven with each other at the points of crossing, said grid having a metallic band integral with each end thereof, said grid being supported from said means by a disk of ceramic material inside the grid adjacent each end thereof which intimately engages the inner surface of each of the bands, and by a ring of ceramic material which surrounds and intimately engages each of said bands and is fastened to said means.

5. A thermionic tube structure comprising support means, an electron-emitting element, a grid surrounding said element, and at least one additional element surrounding said grid, said grid being made of a plurality of wires crossing each other at acute angles at a plurality of points and being interwoven with each other at the points of crossing, said grid having a metallic band integral with each end thereof, said grid being supported from said means by a collar of insulating material which surrounds and intimately engages each of said bands and is fastened to said means.

WILLIAM BRADFORD REED.

REFERENCES CITED

The following references are of record in the file of this patent:

UNITED STATES PATENTS

| Number | Name | Date |
|---|---|---|
| 225,754 | Jenkins | March 23, 1880 |
| 1,844,319 | Hatt | Feb. 9, 1932 |
| 1,963,254 | Urmson | June 19, 1934 |
| 2,002,667 | Knoll | May 28, 1935 |

FOREIGN PATENTS

| Number | Country | Date |
|---|---|---|
| 439,153 | Great Britain | Nov. 29, 1935 |